(12) United States Patent
Shah et al.

(10) Patent No.: US 10,396,860 B2
(45) Date of Patent: Aug. 27, 2019

(54) SYSTEM AND METHOD FOR AUTOMATED CALIBRATION OF WIRELESS IDENTIFICATION DEVICE LOCATION DETERMINATION EQUIPMENT

(71) Applicant: The Boeing Company, Chicago, IL (US)

(72) Inventors: Payal Shah, Charleston, SC (US); Navpreet Singh, Lynnwood, WA (US); Michael D. McInnis, Port Orchard, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/720,105

(22) Filed: Sep. 29, 2017

(65) Prior Publication Data
US 2019/0103897 A1    Apr. 4, 2019

(51) Int. Cl.
| | |
|---|---|
| *G06K 7/10* | (2006.01) |
| *H04B 5/00* | (2006.01) |
| *H04B 7/08* | (2006.01) |
| *H04W 4/80* | (2018.01) |
| *H04W 76/15* | (2018.01) |
| *H04Q 5/22* | (2006.01) |
| *G06K 7/00* | (2006.01) |

(Continued)

(52) U.S. Cl.
CPC ......... *H04B 5/0062* (2013.01); *G06K 7/0095* (2013.01); *H04W 4/80* (2018.02); *H04W 76/15* (2018.02); *H04B 7/0871* (2013.01)

(58) Field of Classification Search
CPC ........ H04W 76/15; H04W 4/80; A04B 17/00; G01S 7/40; G08B 5/22; G08B 13/14

USPC ........... 340/10.1–10.5, 572.1; 342/450, 451, 342/465; 375/228, 345
See application file for complete search history.

(56) References Cited

U.S. PATENT DOCUMENTS

| | | | |
|---|---|---|---|
| 5,689,266 A * | 11/1997 | Stelling ................ | G01S 7/4004 342/165 |
| 6,603,810 B1 * | 8/2003 | Bednekoff ......... | H04B 17/0085 375/228 |

(Continued)

OTHER PUBLICATIONS

Extended Search Report dated Jan. 23, 2019 in corresponding EP Application No. 18178394.5, 6 pgs.

*Primary Examiner* — Nam V Nguyen
(74) *Attorney, Agent, or Firm* — Toler Law Group, PC (57) ABSTRACT

A system and method is described for automated system health status determination, performance calibration, and configuration of a plurality of wireless identification (wireless ID) transceivers (or receivers) to prevent cross-receptions of wireless ID tags in adjacent wireless signal reception areas. Test wireless ID tags are positioned within the wireless signal reception area associated with each of the wireless ID antennas. The configuration parameters for each wireless ID transceiver are adjusted until only data from test wireless ID tags within the wireless signal reception area of the wireless ID antennas associated with that wireless ID transceiver are received by that wireless ID transceiver. Each wireless ID transceiver is configured with the configuration parameters that result in only data from the test wireless ID tags within the wireless signal reception area of the wireless ID antennas associated with that test wireless ID transceiver being received by that wireless ID transceiver.

22 Claims, 3 Drawing Sheets

(51) Int. Cl.
   *G06F 17/30* (2006.01)
   *B60Q 1/00* (2006.01)

(56) References Cited

U.S. PATENT DOCUMENTS

| | | | |
|---|---|---|---|
| 7,598,905 B2* | 10/2009 | Stayton | G01S 7/4004 |
| | | | 342/165 |
| 7,844,505 B1* | 11/2010 | Arneson | G06Q 10/087 |
| | | | 340/10.2 |
| 8,224,610 B2* | 7/2012 | Diorio | G06K 19/0726 |
| | | | 702/106 |
| 8,384,521 B2 | 2/2013 | Matsen et al. | |
| 8,427,279 B2* | 4/2013 | Gravelle | G06K 7/0008 |
| | | | 340/10.1 |
| 8,461,965 B2 | 6/2013 | Chen et al. | |
| 8,552,854 B2* | 10/2013 | Autret | G08C 19/28 |
| | | | 340/539.1 |
| 8,839,056 B2* | 9/2014 | Harvey | H04B 17/0085 |
| | | | 714/712 |
| 8,902,627 B1* | 12/2014 | Pesavento | G11C 16/3404 |
| | | | 365/145 |
| 9,087,226 B2* | 7/2015 | Batra | G06K 7/0008 |
| 9,135,480 B2* | 9/2015 | Gravelle | G06K 7/0008 |
| 9,322,921 B2* | 4/2016 | Josefiak | H03L 1/026 |
| 9,582,692 B2 | 2/2017 | Mitchell et al. | |
| 9,697,395 B2 | 7/2017 | Mally et al. | |
| 9,710,682 B2* | 7/2017 | Butler | H04L 67/1097 |
| 2005/0225436 A1* | 10/2005 | Diorio | G06K 19/0723 |
| | | | 340/10.51 |
| 2006/0049946 A1 | 3/2006 | Sullivan et al. | |
| 2008/0180223 A1 | 7/2008 | Cato et al. | |
| 2009/0167502 A1* | 7/2009 | Erickson | G06K 7/0008 |
| | | | 340/10.3 |
| 2012/0154122 A1* | 6/2012 | Hong | H04B 5/0062 |
| | | | 340/10.5 |
| 2016/0012263 A1 | 1/2016 | Mally et al. | |

* cited by examiner

SYSTEM AND METHOD FOR AUTOMATED CALIBRATION OF WIRELESS IDENTIFICATION DEVICE LOCATION DETERMINATION EQUIPMENT

FIELD

This disclosure relates generally to a system and method for the automated calibration and configuration control of both active and passive wireless identification (ID) device (or simply wireless ID) location determination equipment. In particular, this disclosure relates to the automation of system health status determination, performance calibration, and configuration parameter setting of wireless ID location determination system equipment which track passive wireless and active wireless ID signaling devices or tags.

BACKGROUND

Active and passive wireless signal identification (ID) location determination system technologies are widely used for various tracking and identification purposes, including inventory control and location determination of parts, assemblies, and conveyances in warehouses, factories, manufacturing and assembly areas. Some of these areas may include a large amount of wireless ID location determination system infrastructure equipment installed to track and locate assets such as parts, sub-assemblies, kits, carts, vehicles, etc. for a variety of business purposes. Some wireless ID location determination systems use a passive wireless ID tag that is externally-powered and excited by a wireless signal transmitted from a location system interrogator, while other active wireless ID location determination systems support self-powered active wireless ID tags which are not interrogated but may be excited to transmit their ID by an external wireless signal such as ultrasonic, visible light, infrared, magnetic, or radio waves. Both types of wireless ID tags transmit a wireless signal which provide identification data when either interrogated, excited or self-powered. Wireless ID location determination systems may operate in many regions of the frequency spectrum such as the ultrasound and electromagnetic spectrums which include ultrasonic, visible light, infrared, and radio waves. The location determination system equipment may receive the wireless ID tag identification data that is then processed through a supporting middleware and an associated controller which may provide an application programming interface (API) to communicate with location system equipment and to correlate received (captured) wireless ID tag information with location information data of the equipment from which the data was captured with asset ID information data. The middleware may also apply business logic such as alert or event notifications to system users concerning the location status of an asset. In some of these large installations, several of these location equipment systems may be installed to locate assets in adjacent areas. In this situation, a "cross-reception" may occur between the same type of location systems where a wireless ID tag associated with an asset in a second area may self-power to transmit a wireless signal to or respond to an interrogation or exciter wireless signal from a location system equipment in a first area (or vice versa). This can result in incorrect location identification of an asset, for example.

Accordingly, there is a need for a system and method which overcomes the problems related to cross-reception.

SUMMARY

In a first aspect, a method for system baseline health testing and calibrating a plurality of wireless identification (wireless ID) transceivers or receivers to prevent cross-receptions of wireless ID tags in areas adjacent to wireless ID antennas associated with each of the plurality of wireless ID transceivers or receivers is disclosed. First, test wireless ID tags are positioned within a wireless signal reception area associated with each of the wireless ID antennas. Next, configuration parameters are adjusted for each wireless ID transceiver or receiver until only data from test wireless ID tag within the wireless signal reception area of the wireless ID antenna associated with that wireless ID transceiver or receiver is received by that wireless ID transceiver or receiver and the data received for that test wireless ID tag meets pre-established performance parameters. Finally, each wireless ID transceiver or receiver is calibrated with the configuration parameters that result in only data from the test wireless ID tag within the wireless signal reception area of the wireless ID antenna associated with that wireless ID transceiver or receiver being received by that wireless ID transceiver or receiver and the data received for that test wireless ID tag meets pre-established performance parameters.

In a further embodiment, system baseline health testing is performed with test wireless ID tags prior to the step of calibrating each wireless ID transceiver or receiver. Preferably, the configuration parameters adjusted for each wireless ID transceiver or receiver may include one or more of: system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, and antenna port selections. Also, the configuration parameters adjusted for each wireless ID transceiver or receiver may include wireless ID tag parameter settings. Still further, the configuration parameters for each of the plurality of wireless ID transceivers or receivers may be stored in a central database.

In a second aspect, a system for calibrating a plurality of wireless ID transceivers or receivers to prevent cross-receptions of wireless ID tags in areas adjacent to wireless ID antennas associated with each of the plurality of wireless ID transceivers or receivers is disclosed. A plurality of wireless ID transceivers or receivers are provided. Each of the plurality of wireless ID transceivers or receivers has an associated wireless ID antenna for receiving data from wireless ID tags passing within a wireless signal reception area associated with that wireless ID antenna. In addition, a controller is coupled to each of the plurality of wireless ID transceivers or receivers for controlling operation thereof. The controller adjusts configuration parameters for each wireless ID transceiver or receiver until data from a test wireless ID tag within the associated wireless signal reception area of the associated wireless ID antenna is received by that wireless ID transceiver or receiver and the data received for that test wireless ID tag meets pre-established performance parameters and no data from test wireless ID tags within the wireless signal reception areas of each other wireless ID antenna among the plurality of wireless ID antennas are received by that RFID transceiver or receiver. The controller calibrates each wireless ID transceiver or receiver with the configuration parameters that result in data from a test wireless ID tag within the wireless signal reception area of that wireless ID antenna being received by that wireless ID transceiver or receiver and the data received for that test wireless ID tag meets pre-established performance parameters and no data from test wireless ID tags within the wireless signal reception areas of each other wireless ID antenna among the plurality of wireless ID antennas is received by that wireless ID transceiver or receiver.

In a further embodiment, the controller may perform system baseline health testing with test wireless ID tags prior to calibrating each wireless ID transceiver or receiver. Also, the configuration parameters adjusted for each wireless ID transceiver or receiver may include one or more of: system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, and antenna port selections. The configuration parameters adjusted for each wireless ID transceiver or receiver may also include wireless ID tag parameter settings. The system may further include a network for coupling the controller to each of the plurality of wireless ID transceivers or receivers. The system may also include a middleware and system baseline health test process and calibration process analytics program for use in tracking a location of all wireless ID tags in use. The system may further include a database coupled to the middleware and system baseline health test process and calibration process analytics program for storing the location information of all wireless ID tags in use. Still further, the system may include a network for coupling the middleware and system baseline health test process and calibration process analytics program to each of the plurality of wireless ID transceivers or receivers.

In a third aspect, a system for calibrating a plurality of wireless ID transceivers or receivers to prevent cross-receptions of wireless ID tags in areas adjacent to wireless ID antennas associated with each of the plurality of wireless ID transceivers or receivers is disclosed. The system includes a plurality of wireless ID transceivers or receivers, each of the plurality of wireless ID transceivers or receivers having an associated wireless ID antenna for receiving wireless ID tags passing within a signal reception area associated with that wireless ID antenna. The system also includes a controller within one of the plurality of wireless ID transceivers or receivers and coupled to each other of the plurality of wireless ID transceivers or receivers for controlling operation thereof. The controller adjusts configuration parameters for each wireless ID transceiver or receiver until data from a test wireless ID tag within the associated signal reception area of the associated wireless ID antenna is received by that wireless ID transceivers or receivers and the data received for that test wireless ID tag meets pre-established performance parameters and no data from test wireless ID tags within the signal reception areas of each other wireless ID antenna among the plurality of wireless ID antennas is received by that wireless ID transceivers or receivers. The controller calibrates each wireless ID transceivers or receivers with the configuration parameters that result in a test wireless ID tag within the signal reception area of that wireless ID antenna being received by that wireless ID transceiver or receiver until data received for that test wireless ID tag meets pre-established performance parameters and no test wireless ID tags within the signal reception areas of each other wireless ID antenna among the plurality of wireless ID antennas being received by that wireless ID transceivers or receivers.

In a further embodiment, the controller may perform system baseline health testing with test wireless ID tags prior to calibrating each wireless ID transceiver or receiver. Also, the configuration parameters adjusted for each wireless ID transceiver or receiver may include one or more of: one or more of system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, and antenna port selections. Further, the configuration parameters adjusted for each wireless ID transceiver or receiver may also include wireless ID tag parameter settings. The system may further include a network for coupling the plurality of wireless ID transceivers or receivers to each other. The system may also include a middleware and system baseline health test process and calibration process analytics program for use in tracking a location of all wireless ID tags in use. Still further, the system may include a database coupled to the middleware and system baseline health test process and calibration process analytics program for storing the location of all wireless ID tags in use.

In a fourth aspect, a system for calibrating a plurality of wireless ID transceivers or receivers to prevent cross-receptions of wireless ID tags in areas adjacent to wireless ID antennas associated with each of the plurality of wireless ID transceivers or receivers is disclosed. A plurality of wireless ID transceivers or receivers are provided. Each of the plurality of wireless ID transceivers or receivers has an associated wireless ID antenna for receiving wireless ID tags passing within a signal reception area associated with that wireless ID antenna. In addition, a first controller within one of the plurality of wireless ID transceivers or receivers and a second controller are provided. The first controller and the second controller are coupled to each other and coupled to each other of the plurality of wireless ID transceivers or receivers for controlling operation thereof. The first controller and the second controller adjust configuration parameters for each wireless ID transceivers or receivers until data from a test wireless ID tag within the associated signal reception area of the associated wireless ID antenna is received by that wireless ID transceiver or receiver and the data received for that wireless ID tag meets pre-established performance parameters and no data from test wireless ID tags within the signal reception areas of each other wireless ID antenna among the plurality of wireless ID antennas is received by that wireless ID transceivers or receivers. The first controller and the second controller calibrate each wireless ID transceiver or receiver with the configuration parameters that result in data from a test wireless ID tag within the signal reception area of that wireless ID antenna being received by that wireless ID transceiver or receiver and the data received for that wireless ID tag meets pre-established performance parameters and no data from test wireless ID tags within the signal reception areas of each other wireless ID antenna among the plurality of wireless ID antennas is received by that wireless ID transceiver or receiver.

In a further embodiment, the first controller and the second controller may perform system baseline health testing with test wireless ID tags prior to calibrating each wireless ID transmitter or receiver. Also, the configuration parameters adjusted for each wireless ID transceiver or receiver may include one or more of: one or more of system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, and antenna port selections. The configuration parameters adjusted for each wireless ID transceiver or receiver may also include test wireless ID tag parameter settings. The system may also include a network for coupling the plurality of wireless ID transceivers or receivers to each other and to the second controller. The system may further include a middleware and system baseline health test process and calibration process analytics program for use in tracking a location of all test wireless ID tags in use. Further, the system may include a database coupled to the middleware and system baseline health test process and calibration process analytics program for storing the location of all test wireless ID tags in use.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

A wireless ID location determination system transmitter/receiver (transceiver) or receiver is typically used to receive wireless ID location tag signal transmissions. The wireless ID transceiver or receiver may include an embedded antenna. In some cases, a wireless ID system portal or zone may consist of a matched set of antennas physically situated in a manner such that a gateway that defines a wireless ID tag signal reception area there between is formed. This type of configuration is commonly used with wireless ID tags which are externally powered. In other cases, a single wireless ID system antenna may be employed and the wireless ID tag wireless signal reception area is defined by the type and orientation of the wireless ID antenna selected for the use. In either configuration, antennas for adjacent location determination systems may be installed such that cross-receptions occur from time to time. A cross-reception in an ID location determination system used for supply-chain management can be difficult to identify and may lead to inventory problems or cause unnecessary re-work.

Figure 1:
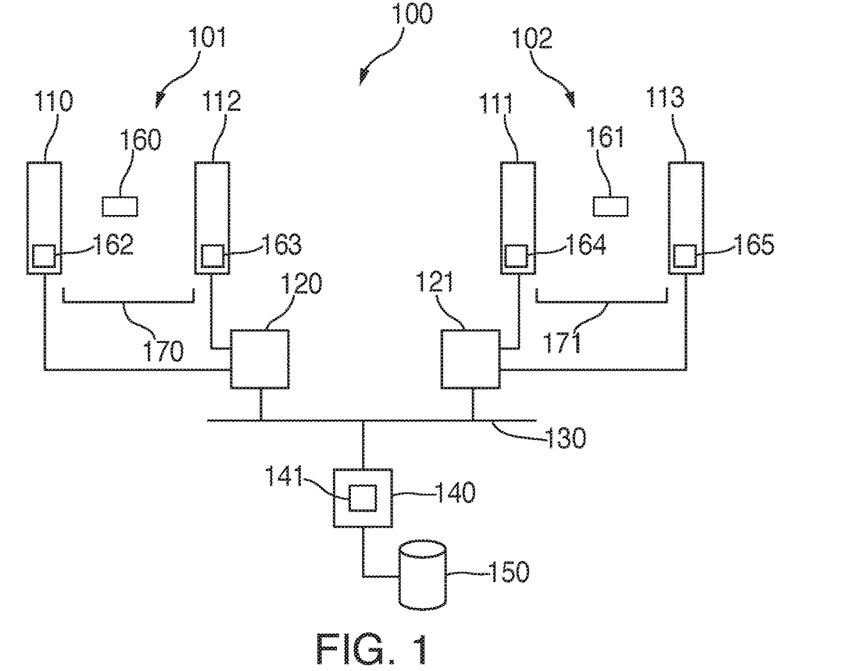
FIG. 1 is a block diagram of a first embodiment of a system for the automated configuration of a plurality of wireless ID location determination systems according to the present disclosure.

Referring now to FIG. 1, a first embodiment of a system 100 is shown for use in system baseline health testing and calibration of individual wireless ID location determination systems to optimize wireless ID tag to transceiver or receiver performance and minimize or eliminate wireless ID tag cross-receptions. Such individual wireless ID location determination systems may be for passive wireless signal portals or active wireless signal zones. System 100 includes at least two of the same technology-type wireless ID location determination systems 101, 102. Although only two wireless ID location determination systems 101, 102 are shown in FIG. 1, the system and method disclosed herein can be applied to implementations having many more separate wireless ID location determination systems. Wireless ID location determination system 101 includes a wireless ID transceiver or receiver 120 coupled to two wireless ID antennas 110, 112 which form a passive wireless signal area portal or active wireless signal area zone. As discussed above in some cases a larger number of wireless ID antennas may be required for each wireless ID system. In other cases only a single wireless ID antenna may be needed. Wireless ID system 101 has a wireless signal reception area 170 for wireless ID tags (such as test wireless ID tags 160, 162, and 163). Likewise, wireless ID system 102 includes a wireless ID transceiver or receiver 121 coupled to two wireless ID antennas 111, 113. Wireless ID system 102 has a wireless signal reception area 171 for wireless ID tags (such as test wireless ID tags 161, 164, and 165). Each of the wireless ID transceivers or receivers 120, 121 is coupled to a controller 140 via a communications link such as a local area network 130. Although a local area network 130 is shown in FIG. 1, other types of communications links may be used to couple wireless ID transceivers or receivers 120, 121 to controller 140. Controller 140 is associated with a middleware and system baseline health test and calibration process analytics program 141. Program 141 preferably includes a performance analytics application and pattern recognition techniques or algorithms which learn test wireless ID tag signal behavior during the wireless ID location determination system equipment calibration process. Controller 140 is also coupled to a database 150.

Controller 140 and middleware and system baseline health test and calibration process analytics program 141 control the normal operation of each of the wireless ID systems 101, 102, manage the ordinary supply chain management functions, and store the information collected from each wireless ID system 101, 102 in database 150. Controller 140 (with middleware and system baseline health test and calibration process analytics program 141) also controls the system baseline health testing and calibration process operation of wireless ID transceivers or receivers 120, 121. In addition, in a configuration mode, controller 140 changes wireless ID transceiver or receiver 120, 121 configuration parameters as required by direction of the calibration process analytics program 141 to determine the optimum configuration parameters for each wireless ID system 101, 102 that allows wireless ID tags within the wireless signal reception area associated with the respective wireless ID system to be received but prevent wireless ID tags within the wireless signal reception area of other wireless ID systems being received from outside their respective wireless signal reception areas. For example, after final configuration parameters of wireless ID transceivers or receivers 120, 121 are determined, wireless ID transceiver or receiver 120 will be able to receive test wireless ID tags 160, 162, and 163 but will not be able to receive test wireless ID tags 161, 164, or 165 and wireless ID transceiver or receiver 121 will be able to receive test wireless ID tags 161, 164, and 165 but will not be able to receive test wireless ID tags 160, 162, or 163. In particular, during system baseline health testing, controller 140 follows a system baseline health test process directed by the calibration process analytics program 141 that sequentially adjusts and steps through the configuration parameters for wireless ID transceiver or receiver 120 until test wireless ID tags 162, 163 positioned near or attached to the associated wireless ID antennas 110, 112 within the associated wireless signal reception area (e.g., wireless signal reception area 170) are read by that wireless ID transceiver or receiver (e.g., wireless ID transceiver or receiver 120). If the data received from test wireless ID tags 162 and 163 does not meet pre-established performance parameters then the system baseline health test ends. If the data received from test wireless ID tags 162 and 163 meets pre-established performance parameters then the middleware and system baseline health test process and calibration process analytics program 141 begins a calibration test process to determine the final configuration parameters for wireless ID transceiver or receiver 120. In particular, controller 140 sequentially adjusts and steps through configuration parameters for wireless ID transceiver or receiver 120 until all test wireless ID tags 160, 162, 163 positioned within the associated wireless signal reception area (e.g., wireless signal reception area 170) of the associated wireless ID antennas (e.g., wireless ID antennas 110 and 112) are read by that wireless ID transceiver or receiver (e.g., wireless ID transceiver or receiver 120) and no test wireless ID tags (e.g., test wireless ID tags 161, 164, 165) within the wireless signal reception areas (e.g., wireless signal reception area 171) of each other wireless ID antenna (e.g., wireless ID antenna 111, 113) are received by that wireless ID transceiver or receiver (e.g., wireless ID transceiver or receiver 120). If the data received from test wireless ID tags 160, 162 and 163 does not meet pre-established performance parameters, or data is received from test wireless ID tags 161, 164, or 165 in adjacent wireless signal reception area 171 then the calibration test process ends. If the data received from each test wireless ID tag 160, 162, and 163 meets pre-established performance parameters and no test wireless ID tags 161, 164, 165 from wireless signal reception area 171 are received then the calibration test process is complete, controller 140 configures each wireless ID transceiver or receiver 120 with the configuration parameters identified during operations configuration or alternatively sends the configuration parameters for each transceiver or receiver to database 150. This process is particularly effective because in many cases a number of different types of wireless ID systems are used in a single installation (e.g. in different parts of a factory) and by separately and sequentially calibrating and configuring each separate wireless ID system, it can be assured that no cross-receptions will occur during ordinary operation.

During configuration of each wireless ID system 101, 102, controller 140, middleware and system baseline health test process and calibration process analytics program 141 may capture, analyze, or adjust one or more of, but not limited to, the following configuration parameters for each wireless ID transceiver or receiver 120, 121: system transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID tag transmission period rate settings, wireless ID tag orientations, distance between wireless ID location determination system passive wireless signal reception portal antennas or active wireless signal reception area zone antennas and distances to adjacent passive portal or active zone antennas, GS1 EPC global Low Level Reader Protocol (LLRP) standard configuration parameters, wireless ID equipment manufacturer custom configuration parameters, and antenna port selections. Controller 140, middleware and system baseline health test process and calibration process analytics program 141, may also store the configuration parameters for each of the plurality of wireless ID transceivers or receivers 120, 121 in a database 150.

Figure 2:
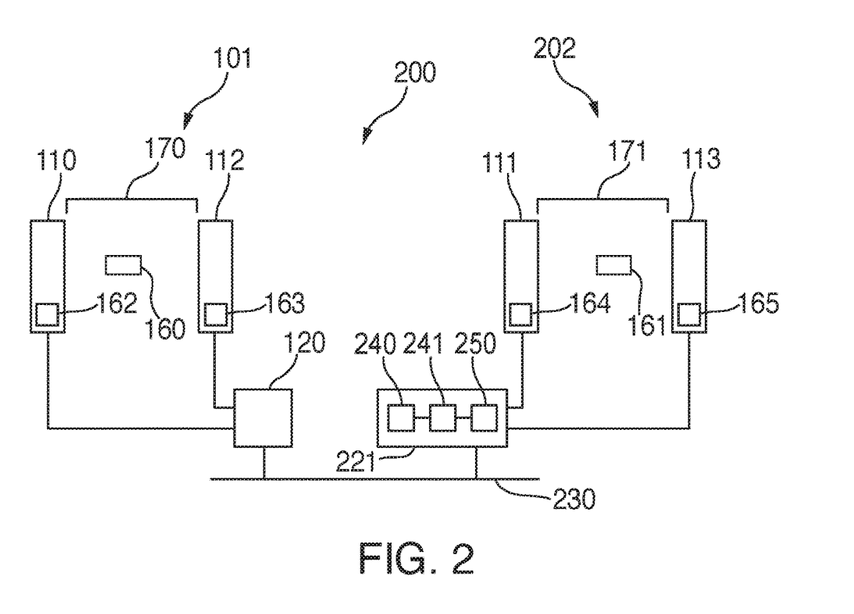
FIG. 2 is a block diagram of a second embodiment of a system for the automated configuration of a plurality of wireless ID location determination systems according to the present disclosure.

Referring now to FIG. 2, a second embodiment of a system 200 for calibrating configuration parameters for wireless ID transceivers or receivers and minimizing or eliminating cross-receptions in adjacent wireless ID systems is shown. In system 200, two wireless ID systems 101, 202 are provided coupled by a local area network 230, although, as with the embodiment of FIG. 1, the principles of this disclosure may apply to systems having more than two different wireless ID systems. Wireless ID system 101 is identical to that of FIG. 1. However, in system 200, wireless ID system 202 includes a wireless ID transceiver or receiver 221 which incorporates a controller 240, middleware and system baseline health test process and calibration process analytics program 241, and a database 250. Controller 240, middleware and system baseline health test process and calibration process analytics program 241 and database 250 operate in the same way and provide the same functionality as controller 140, middleware and system baseline health test process and calibration process analytics program 141, and database 150 of the embodiment shown in FIG. 1, but are provided as part of the wireless ID system 202. In a third embodiment, a system for calibrating configuration parameters for wireless ID transceivers or receivers and minimizing or eliminating cross-receptions in adjacent wireless ID systems may include both a remote controller coupled to the local area network 130 (such as controller 140 in FIG. 1) and a local controller incorporated into one or more of the wireless ID transceivers or receivers. In this third embodiment, the functionality of controller 140 in the FIG. 1 embodiment and of controller 240 in the FIG. 2 embodiment may be shared among the two controllers.

Figure 3:
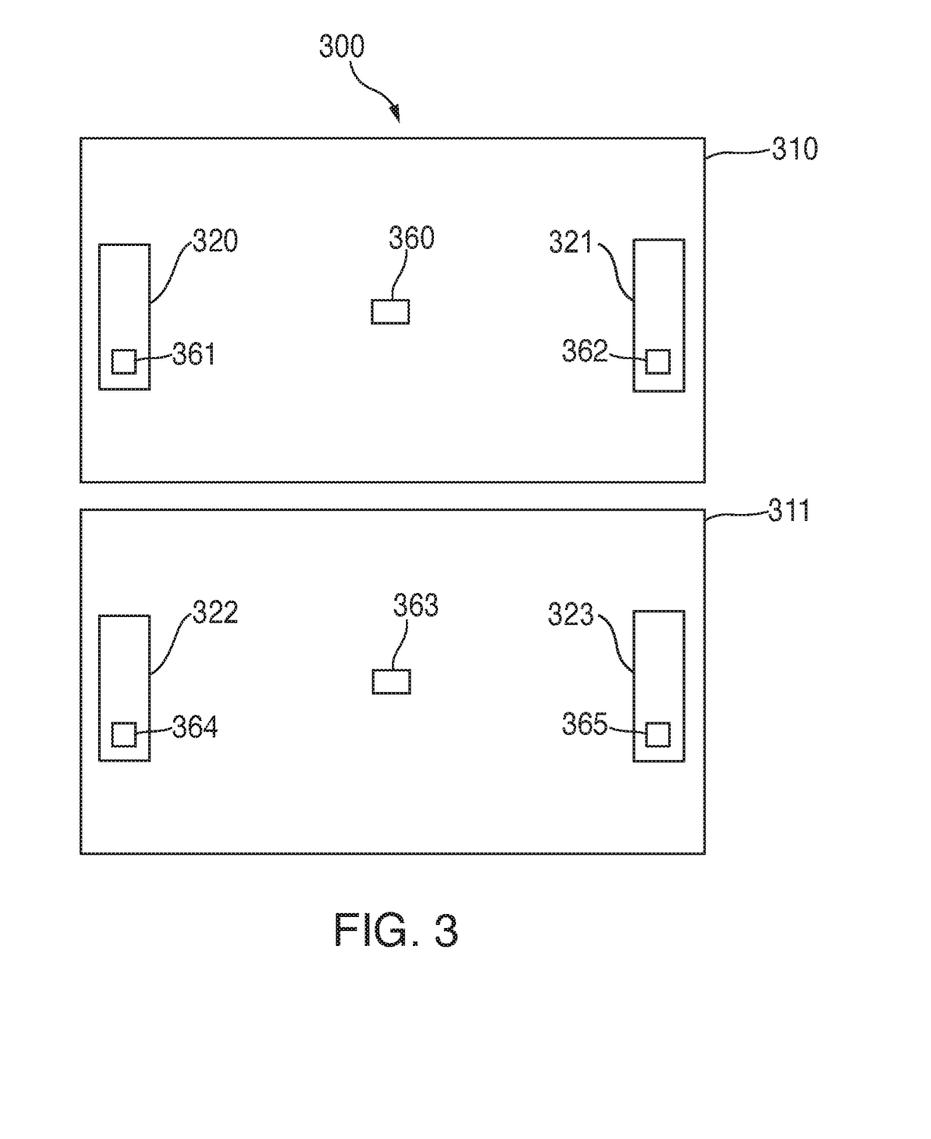
FIG. 3 is a schematic plan view of an installation of two adjacent wireless ID location determination systems.

Referring now to FIG. 3, a factory floor 300 is shown including two adjacent passive wireless signal portal areas or active wireless signal areas 310, 311. Wireless signal area 310 is formed by wireless ID antennas 320, 321 and wireless signal area 311 is formed by wireless ID antennas 322, 323. Test wireless ID tags 360, 361, 362 are positioned within wireless signal area 310 and test wireless ID tags 363, 364, 365 are positioned within wireless signal area 311. Without the advantages provided by the system and method of the present disclosure, in some situations, test wireless ID tags 360, 361 or 362 could be inadvertently received by the wireless ID transceiver or receiver configured to receive wireless ID tag signal transmissions within wireless signal area 311 and test wireless ID tag 363, 364, or 365 could be inadvertently received by the wireless ID transceiver or receiver configured to receive wireless ID tag signal transmissions within wireless signal area 310. But by applying the advantages provided by the system and method of the present disclosure, it can be assured that test wireless ID tags 360, 361, 362 will only be received by the wireless ID transceiver or receiver configured to receive tags in wireless signal area 310 and test wireless ID tag 363, 364, 365 will only be received by the wireless ID transceiver or receiver configured to receive tags in wireless signal area 311.

Figure 4:
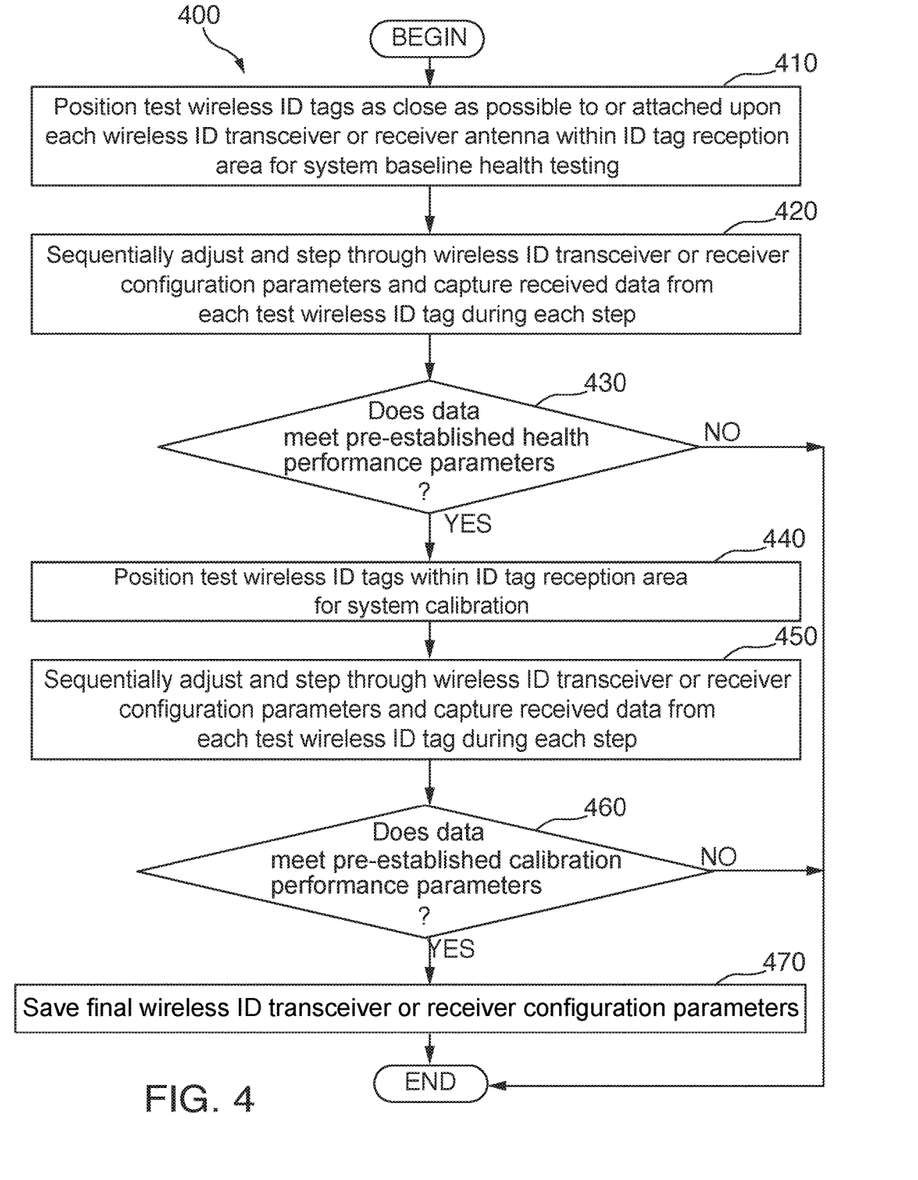
FIG. 4 is a flowchart of a method for the automated configuration of a plurality of wireless ID location determination systems according to an embodiment of the present disclosure.

Referring now to FIG. 4, a method 400 is shown for calibrating a plurality of wireless identification (ID) transceivers or receivers 120, 121, 221 to prevent cross-receptions of test wireless ID tags 160, 161, 162, 163, 164, 165 in areas adjacent to wireless ID antennas 110, 111, 112, 113 associated with each of the plurality of wireless ID transceivers or receivers. First, at step 410, test wireless ID tags 162, 163, 164, 165 are positioned as close as possible to, or attached upon, each wireless ID antenna 110, 111, 112, 113 within wireless signal reception area 170, 171 and then each wireless tag identifier information is entered into a controller database. At step 420 system baseline health testing is performed for each test wireless ID tag 162, 163, 164, 165. In this manner, the wireless ID transceiver or receiver configuration parameters are sequentially adjusted and stepped through and received data from each test wireless ID tag is received during each step. At step 430, if the data received from test wireless ID tags 162, 163, 164, 165 does not meet pre-established performance parameters then the system baseline health test ends. If the data received from test wireless ID tags 162, 163, 164, 165 meets pre-established performance parameters then processing continues with the calibration process analytics program 141 beginning a calibration test process. At step 440, test wireless ID tags 160, 161 are positioned within a read area associated with each of the wireless ID antennas 110, 111, 112, 113. In particular, test wireless ID tags 160, 161 are positioned within each ID location determination equipment tag signal reception area, either mounted on or off of particular assets, at selected distances, heights, and test wireless ID tag physical polarizations as related to the antennas and each test wireless ID tag identifier information is entered into the controller database for system calibration testing. Next, at step 450, wireless ID transceiver or receiver configuration parameters are sequentially adjusted and stepped through and received data is received from each test wireless ID tag. In particular, configuration parameters are sequentially adjusted, entered, and tested in steps for each wireless ID transceiver or receiver 120, 121, 221 until all test wireless ID tags (e.g., test wireless ID tags 160, 161, 162, 163, 164, 165) positioned within the associated wireless signal reception area (e.g., wireless signal reception area 170, 171) of the associated wireless ID antennas (e.g., wireless ID antennas 110, 111, 112, 113) are read by that wireless ID transceiver or receiver (e.g., wireless ID transceiver or receiver 120, 121, 221). Preferably, the configuration parameters adjusted for each wireless ID transceiver or receiver may include one or more of: system transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID tag transmission period rate settings, wireless ID tag orientations, distance between wireless ID location determination system passive wireless signal reception portal antennas or active wireless signal reception area zone antennas and distances to adjacent passive portal or active zone antennas, GS1 EPC global Low Level Reader Protocol (LLRP) standard configuration parameters, wireless ID equipment manufacturer custom configuration parameters, and antenna port selections. At step 460, if the data received from test wireless ID tags does not meet pre-established performance parameters, or test wireless ID tag data is received from wireless ID test tags in an adjacent wireless signal reception area, then the calibration test process ends. If the data received from each wireless ID test tag meets pre-established performance parameters, and no data from test wireless ID tags from adjacent wireless signal reception areas is received, then the calibration test process is complete and processing continues. Finally at step 470, the controller 140 saves the configuration parameters identified during operations calibration by configuring each wireless ID transceiver or receiver 120, 121 with those configuration parameters and/or sends the configuration parameters for each transceiver or receiver to the database 150 (or 250). After this, processing ends.

The system and method of this disclosure provides a solution for the automation of testing, analyzing, configuring and establishing common configuration parameters of wireless ID infrastructure equipment enterprise-wide. Many companies are currently implementing wireless ID infrastructure equipment enterprise wide to support production and manufacturing asset tracking. The use of the system and method of this disclosure will calibrate configuration parameters and minimize or eliminate wireless ID tag cross-receptions, and moreover, reduce or eliminate guess-work involved in setting wireless ID infrastructure equipment configuration parameters and thereby improves asset tracking accuracy and prevents costly and unnecessary equipment configuration parameter adjustment rework through testing and calibrating wireless ID portal or zone location accuracy.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:
1. A method comprising:
receiving, via a plurality of wireless identification receivers at a first time, a first plurality of data transmissions from a plurality of wireless identification tags, wherein each wireless identification receiver of the plurality of wireless identification receivers is associated with a corresponding reception area of a plurality of reception areas, and wherein each reception area of the plurality of reception areas includes a corresponding wireless identification tag of the plurality of wireless identification tags;
responsive to a first wireless identification receiver of the plurality of wireless identification receivers receiving a first data transmission of the first plurality of data transmissions and a second data transmission of the first plurality of data transmissions, adjusting configuration parameters for the first wireless identification receiver to generate updated configuration parameters, wherein the first data transmission corresponds to a first wireless identification tag of the plurality of wireless identification tags, the first wireless identification tag corresponding to a first reception area of the plurality of reception areas, the first reception area corresponding to the first wireless identification receiver, and wherein the second data transmission corresponds to a second wireless identification tag of the plurality of wireless identification tags, the second wireless identification tag corresponding to a second reception area of the plurality of reception areas, the second reception area distinct from the first reception area;

receiving, via the plurality of wireless identification receivers at a second time, a second plurality of data transmissions from the plurality of wireless identification tags, wherein the first wireless identification receiver uses the updated configuration parameters while receiving the second plurality of data transmissions; and responsive to the first wireless identification receiver receiving only a third data transmission of the second plurality of data transmissions, maintaining the updated configuration parameters, wherein the third data transmission corresponds to the first wireless identification tag.

2. The method of claim 1, wherein the first wireless identification receiver is a wireless identification transceiver.

3. The method of claim 1, wherein the configuration parameters comprise system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, antenna port selections, or a combination thereof.

4. The method of claim 1, wherein the configuration parameters are adjusted by a controller communicatively coupled to the plurality of wireless identification receivers.

5. The method claim 4, wherein a second controller is communicatively coupled to the controller.

6. The method of claim 5, further comprising adjusting second configuration parameters of a second wireless identification receiver via the second controller.

7. The method of claim 1, further comprising storing the updated configuration parameters in a database.

8. The method of claim 1, wherein the first plurality of data transmissions comprises a plurality of radio frequency transmissions.

9. A system comprising:
a plurality of wireless identification receivers configured to:
receive a first plurality of data transmissions from a plurality of wireless identification tags at a first time, wherein each wireless identification receiver of the plurality of wireless identification receivers is associated with a corresponding reception area of a plurality of reception areas, and wherein each reception area of the plurality of reception areas includes a corresponding wireless identification tag of the plurality of wireless identification tags; and
receive a second plurality of data transmissions from the plurality of wireless identification tags at a second time, wherein a first wireless identification receiver of the plurality of wireless identification receivers uses updated configuration parameters while receiving the second plurality of data transmissions; and
a controller configured to:
responsive to the first wireless identification receiver receiving a first data transmission of the first plurality of data transmissions and a second data transmission of the first plurality of data transmissions, adjust configuration parameters for the first wireless identification receiver to generate updated configuration parameters, wherein the first data transmission corresponds to a first wireless identification tag of the plurality of wireless identification tags, the first wireless identification tag corresponding to a first reception area of the plurality of reception areas, the first reception area corresponding to the first wireless identification receiver, and wherein the second data transmission corresponds to a second wireless identification tag of the plurality of wireless identification tags, the second wireless identification tag corresponding to a second reception area of the plurality of reception areas, the second reception area distinct from the first reception area; and
responsive to the first wireless identification receiver receiving only a third data transmission of the second plurality of data transmissions, maintain the updated configuration parameters, wherein the third data transmission corresponds to the first wireless identification tag.

10. The system of claim 9, wherein the first wireless identification receiver is a wireless identification transceiver.

11. The system of claim 9, wherein the configuration parameters comprise system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, antenna port selections, or a combination thereof.

12. The system of claim 9, further comprising a network communicatively coupling the plurality of wireless identification receivers to the controller.

13. The system of claim 9, wherein the controller is further configured to store the updated configuration parameters in a database.

14. The system of claim 9, wherein the first plurality of data transmissions comprises a plurality of radio frequency transmissions.

15. The system claim 9, further comprising a second controller that is communicatively coupled to the controller.

16. The system of claim 15, wherein the second controller is configured to adjust second configuration parameters of a second wireless identification receiver.

17. A non-transitory computer-readable storage device storing instructions that are executable by a processor to cause the processor to perform operations comprising:
receiving, via a plurality of wireless identification receivers at a first time, a first plurality of data transmissions from a plurality of wireless identification tags, wherein each wireless identification receiver of the plurality of wireless identification receivers is associated with a corresponding reception area of a plurality of reception areas, and wherein each reception area of the plurality of reception areas includes a corresponding wireless identification tag of the plurality of wireless identification tags;
responsive to a first wireless identification receiver of the plurality of wireless identification receivers receiving a first data transmission of the first plurality of data transmissions and a second data transmission of the first plurality of data transmissions, adjusting configuration parameters for the first wireless identification receiver to generate updated configuration parameters, wherein the first data transmission corresponds to a first wireless identification tag of the plurality of wireless identification tags, the first wireless identification tag corresponding to a first reception area of the plurality of reception areas, the first reception area corresponding to the first wireless identification receiver, and wherein the second data transmission corresponds to a second wireless identification tag of the plurality of wireless identification tags, the second wireless identification tag corresponding to a second reception area of the plurality of reception areas, the second reception area distinct from the first reception area;

receiving, via the plurality of wireless identification receivers at a second time, a second plurality of data transmissions from the plurality of wireless identification tags, wherein the first wireless identification receiver uses the updated configuration parameters while receiving the second plurality of data transmissions; and responsive to the first wireless identification receiver receiving only a third data transmission of the second plurality of data transmissions, maintaining the updated configuration parameters, wherein the third data transmission corresponds to the first wireless identification tag.

18. The non-transitory computer-readable storage device of claim 17, wherein the first wireless identification receiver is a wireless identification transceiver.

19. The non-transitory computer-readable storage device of claim 17, wherein the configuration parameters comprise system signal transmitter power, system signal transmitter modulation selection, system packet transmission counts, wireless ID tag packet transmission counts, system receiver sensitivity threshold settings, wireless ID tag received signal strength indicator values, received wireless ID tag packet filter settings, wireless ID transmission period rate setting, global Low Level Reader Protocol control parameter settings, antenna port selections, or a combination thereof.

20. The non-transitory computer-readable storage device of claim 17, wherein the configuration parameters are adjusted by a controller communicatively coupled to the plurality of wireless identification receivers, the controller comprising the processor.

21. The non-transitory computer-readable storage device of claim 17, wherein the operations further comprise storing the updated configuration parameters in a database.

22. The non-transitory computer-readable storage device of claim 17, wherein the first plurality of data transmissions comprises a plurality of radio frequency transmissions.

* * * * *